United States Patent
Lathrop et al.

(10) Patent No.: US 12,045,505 B2
(45) Date of Patent: Jul. 23, 2024

(54) SCANNING PAGES OF SHARED MEMORY

(71) Applicant: Dell Products L.P., Hopkinton, MA (US)

(72) Inventors: Stephen M Lathrop, Milford, MA (US); Chaitanya Lohani, Bangalore (IN); Jeremy O'Hare, Westborough, MA (US); Anoop Raghunathan, Ashland, MA (US)

(73) Assignee: Dell Products L.P., Hopkinton, MA (US)

( * ) Notice: Subject to any disclaimer, the term of this patent is extended or adjusted under 35 U.S.C. 154(b) by 94 days.

(21) Appl. No.: 17/580,700

(22) Filed: Jan. 21, 2022

(65) Prior Publication Data

US 2023/0236759 A1    Jul. 27, 2023

(51) Int. Cl.
G06F 3/06    (2006.01)

(52) U.S. Cl.
CPC ............ G06F 3/0659 (2013.01); G06F 3/061 (2013.01); G06F 3/067 (2013.01)

(58) Field of Classification Search
CPC ......... G06F 3/0659; G06F 3/061; G06F 3/067
See application file for complete search history.

(56) References Cited

U.S. PATENT DOCUMENTS

| | | | | |
|---|---|---|---|---|
| 6,631,447 B1* | 10/2003 | Morioka | ............. | G06F 12/0826 711/124 |
| 2004/0215883 A1* | 10/2004 | Bamford | ............. | G06F 12/0871 711/129 |
| 2010/0275219 A1* | 10/2010 | Carlson | ................. | H04L 41/069 709/224 |
| 2014/0032595 A1* | 1/2014 | Makkar | ................... | G06F 16/25 707/E17.044 |
| 2019/0114114 A1* | 4/2019 | Trika | ................... | H03M 13/154 |
| 2020/0341666 A1* | 10/2020 | Bassov | ............... | G06F 11/1004 |

* cited by examiner

*Primary Examiner* — Kalpit Parikh
(74) *Attorney, Agent, or Firm* — Anderson Gorecki LLP

(57) ABSTRACT

A task generator runs on a data storage system in which multiple compute nodes allocate portions of local memory to a remotely accessible shared memory. The task generator is responsive to a primary task to be performed on a storage object to generate separate, per-compute node secondary tasks corresponding to the primary task. Each of the separate secondary tasks specifies at least one attribute of metadata associated with the storage object and at least one task logic function. Each of the plurality of compute nodes performs the separate secondary task generated for that compute node by scanning the local portion of the shared memory based on the attribute to identify matching pages of the metadata associated with the storage object and performs the task logic function on the identified matching pages of the metadata associated with the storage object to generate a local result. The task generator combines the local results to perform the primary task.

20 Claims, 5 Drawing Sheets

SCANNING PAGES OF SHARED MEMORY

TECHNICAL FIELD

The subject matter of this disclosure is generally related to electronic data storage, and more particularly to scanning metadata pages in a shared memory space in a data storage system in which multiple compute nodes allocate portions of local memory to the shared memory space.

BACKGROUND

High-capacity data storage systems such as storage area networks (SANs) and storage arrays are used to maintain large storage objects that may be contemporaneously used by multiple clients such as host servers. A storage array is a block-based storage system that includes a network of specialized, interconnected compute nodes that manage access to data stored on arrays of non-volatile drives. The compute nodes respond to input-output (IO) commands from host applications that run on the host servers. Examples of host applications may include, but are not limited to, software for email, accounting, manufacturing, inventory control, and a wide variety of other business processes. Each of the compute nodes is implemented as a separate printed circuit board (PCB) or blade. A portion of local memory on each PCB or blade is allocated to a shared memory space that can be accessed by the all the compute nodes, e.g., via remote direct memory access (RDMA). The shared memory is used to store host application data and associated metadata, e.g., pointers and other metadata objects that describe the storage objects maintained by the storage array.

SUMMARY

An apparatus in accordance with some implementations comprises: a storage system comprising a plurality of compute nodes that each allocate a portion of local memory to a shared memory that is accessible by other ones of the compute nodes; and at least one task generator configured to receive a request to perform a primary task on a storage object and generate separate secondary tasks corresponding to the primary task for each of the plurality of compute nodes, each of the separate secondary tasks specifying at least one attribute of metadata associated with the storage object and at least one task logic function; each of the plurality of compute nodes configured to perform the separate secondary task generated for that compute node, including scanning the portion of the shared memory that is local to that compute node based on the attribute to identify matching pages of the metadata associated with the storage object in the portion of the shared memory that is local to that compute node and performing the task logic function on the identified matching pages of the metadata associated with the storage object to generate a local result; the task generator configured to combine local results generated by each separate secondary task performed by each of the plurality of compute nodes and use the combined local results to perform the primary task.

In accordance with some implementations, a method implemented in a storage system having a plurality of compute nodes that each allocate a portion of local memory to a shared memory that is accessible by other ones of the compute nodes, comprises: receiving a request to perform a primary task on a storage object; generating separate secondary tasks corresponding to the primary task for each of the plurality of compute nodes, each of the separate secondary tasks specifying at least one attribute of metadata associated with the storage object and at least one task logic function; performing, at each of the plurality of compute nodes, the separate secondary task generated for that compute node, including scanning the portion of the shared memory that is local to that compute node based on the attribute to identify matching pages of the metadata associated with the storage object in the portion of the shared memory that is local to that compute node; performing, at each of the plurality of compute nodes, the task logic function on the identified matching pages of the metadata associated with the storage object to generate a local result; combining local results generated by each separate secondary task performed by each of the plurality of compute nodes; and using the combined local results to perform the primary task.

A non-transitory computer-readable storage medium in accordance with some implementations comprises instructions that, when executed by a storage system having a plurality of compute nodes that each allocate a portion of local memory to a shared memory that is accessible by other ones of the compute nodes, cause the storage system to implement a method comprising the steps of: receiving a request to perform a primary task on a storage object; generating separate secondary tasks corresponding to the primary task for each of the plurality of compute nodes, each of the separate secondary tasks specifying at least one attribute of metadata associated with the storage object and at least one task logic function; performing, at each of the plurality of compute nodes, the separate secondary task generated for that compute node, including scanning the portion of the shared memory that is local to that compute node based on the attribute to identify matching pages of the metadata associated with the storage object in the portion of the shared memory that is local to that compute node; performing, at each of the plurality of compute nodes, the task logic function on the identified matching pages of the metadata associated with the storage object to generate a local result; combining local results generated by each separate secondary task performed by each of the plurality of compute nodes; and using the combined local results to perform the primary task.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
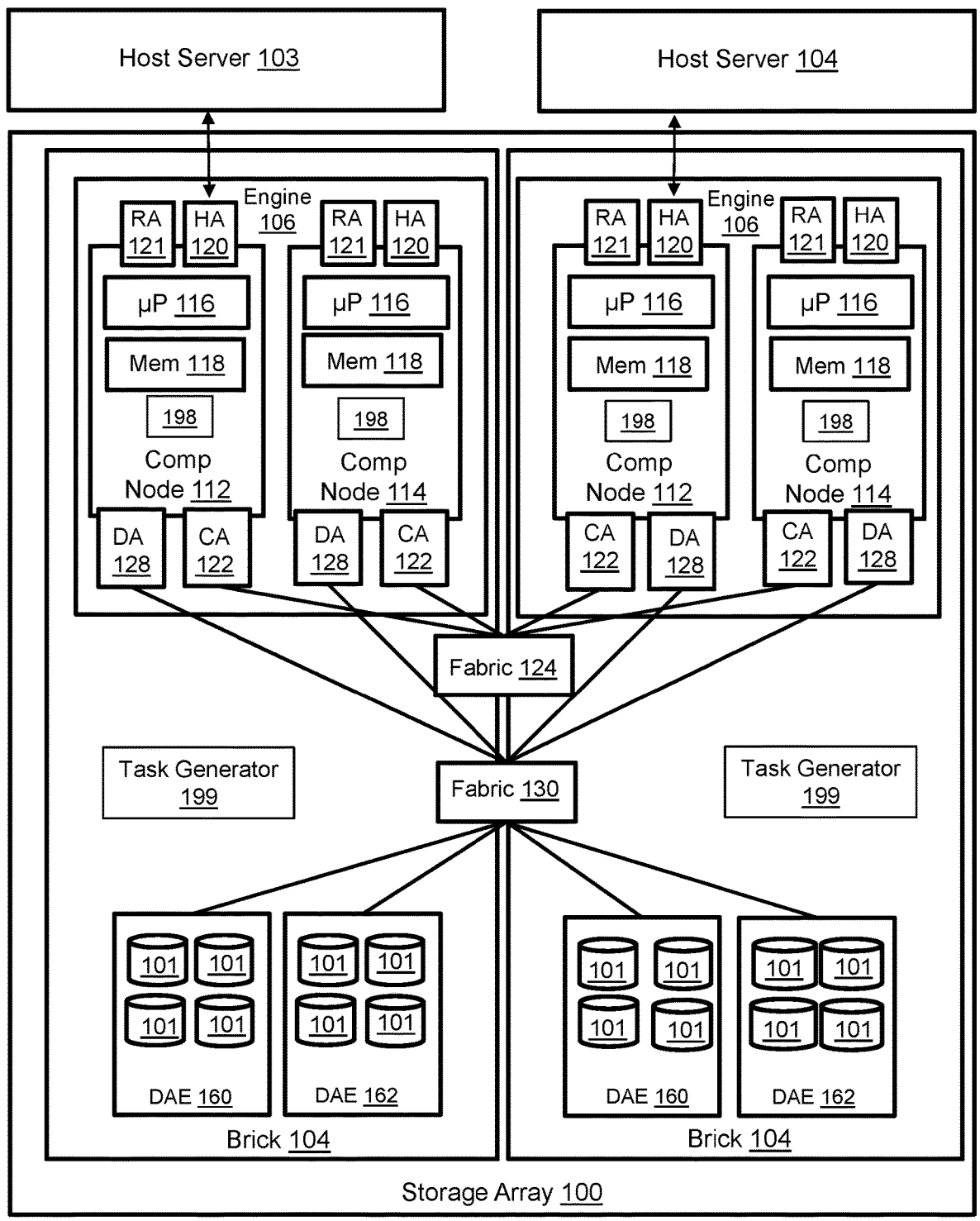
FIG. 1 illustrates a storage array with task generators that create per-compute node cache skimmer tasks to scan pages of metadata in local portions of shared memory to evaluate, validate, and manage storage objects.

FIG. 1 illustrates a storage array 100 with task generators 199 that create and run cache skimmer tasks 198 to scan pages of metadata in shared memory to evaluate, validate, and manage storage objects. The storage array is one example of a SAN, which is one example of a data storage system in which the task generators could be implemented. The storage array 100 is depicted in a simplified data center environment supporting two host servers 103, 104 that run host applications. However, the storage array would typically support more than two host servers. The host servers 103, 104 may include volatile memory, non-volatile storage, and one or more tangible processors that support instances of a host application, as is known in the art.

The storage array 100 includes one or more bricks 104. Each brick 104 includes an engine 106 and one or more disk array enclosures (DAEs) 160, 162. In the simplified example used herein to describe the concepts there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103, 104. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. The task generators 199 may be implemented with specialized hardware, computer program code running on the processors, or both.

Figure 2:
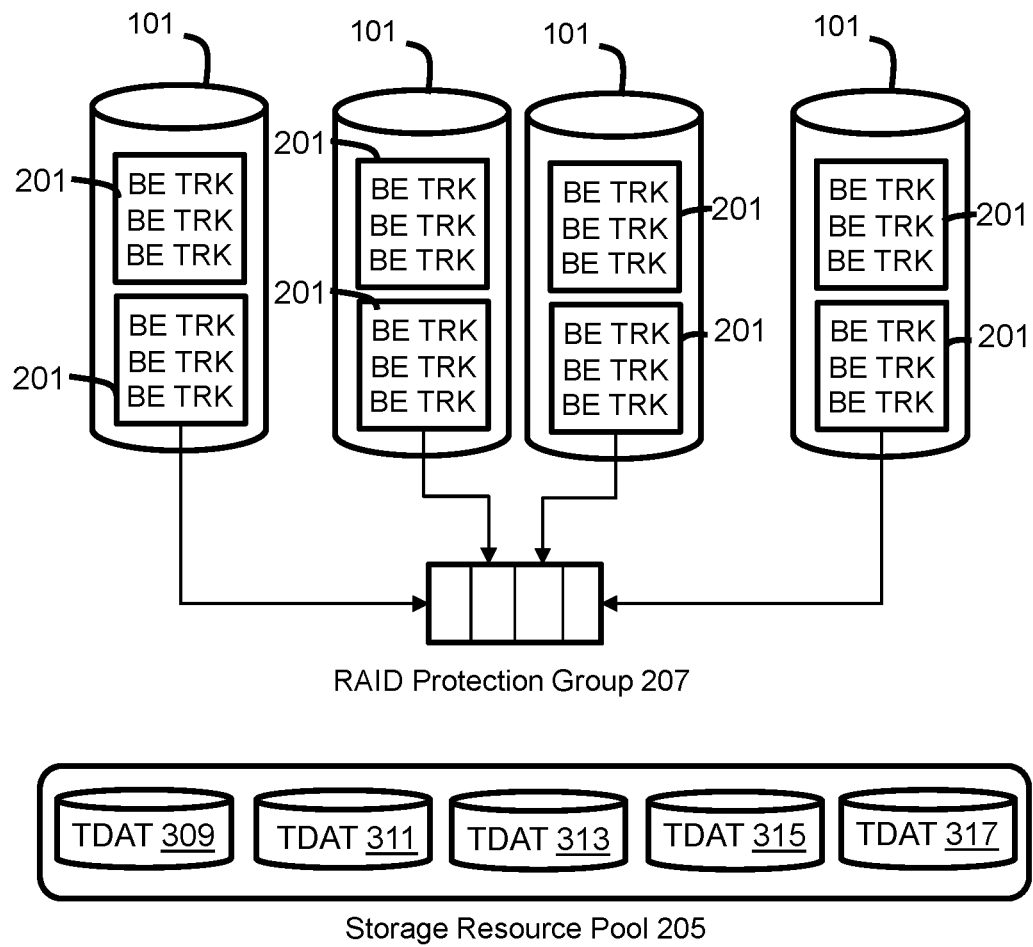
FIG. 2 illustrates layers of abstraction between managed drives and production storage objects.
Figure 2:
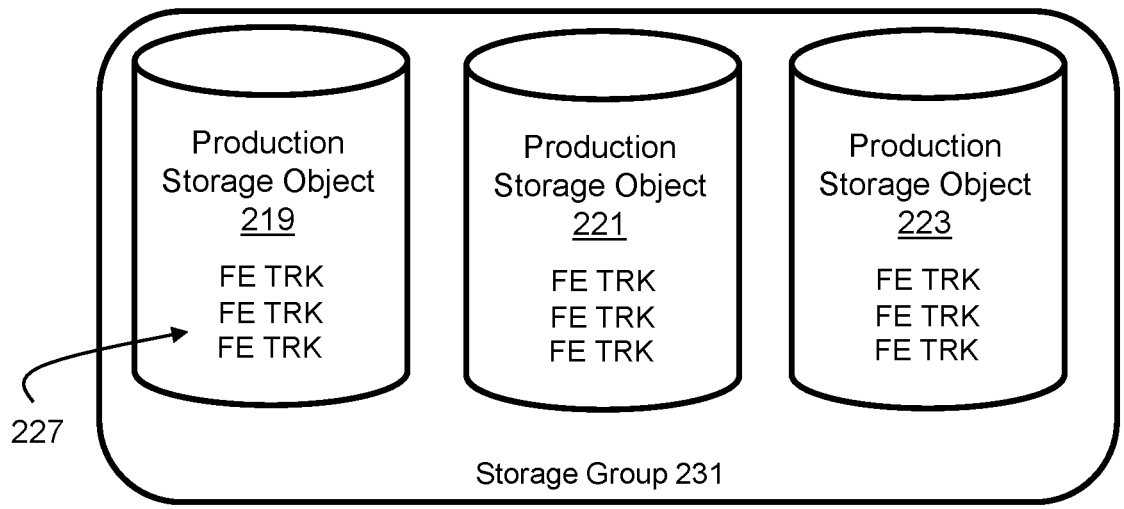

Referring to FIGS. 1 and 2, host application data is persistently stored on the managed drives 101. The managed drives are not discoverable by the host servers 103, 104 so, to make the host application data accessible to the host servers, the storage array 100 creates logical storage objects that can be discovered by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. In the illustrated example there are three production storage objects 219, 221, 223. From the perspective of the host servers 103, 104, each production storage object is a single disk having a set of contiguous fixed-size logical block addresses (LBAs) on which data used by the instances of a host application resides. However, the host application data is stored at non-contiguous addresses on various managed drives 101. A storage group 231 of production storage objects 219, 221, 223 may be created for an individual host application. Multiple instances of a single host application may use data from the same storage group, but instances of different host applications do not use data from the same storage group. The storage array may maintain a large number of production storage objects and storage groups.

The compute nodes 112, 114 maintain metadata that maps between the LBAs of the production storage objects 219, 221, 223 and physical addresses on the managed drives 101 in order to process IOs from the host servers. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects 219, 221, 223. The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 3:
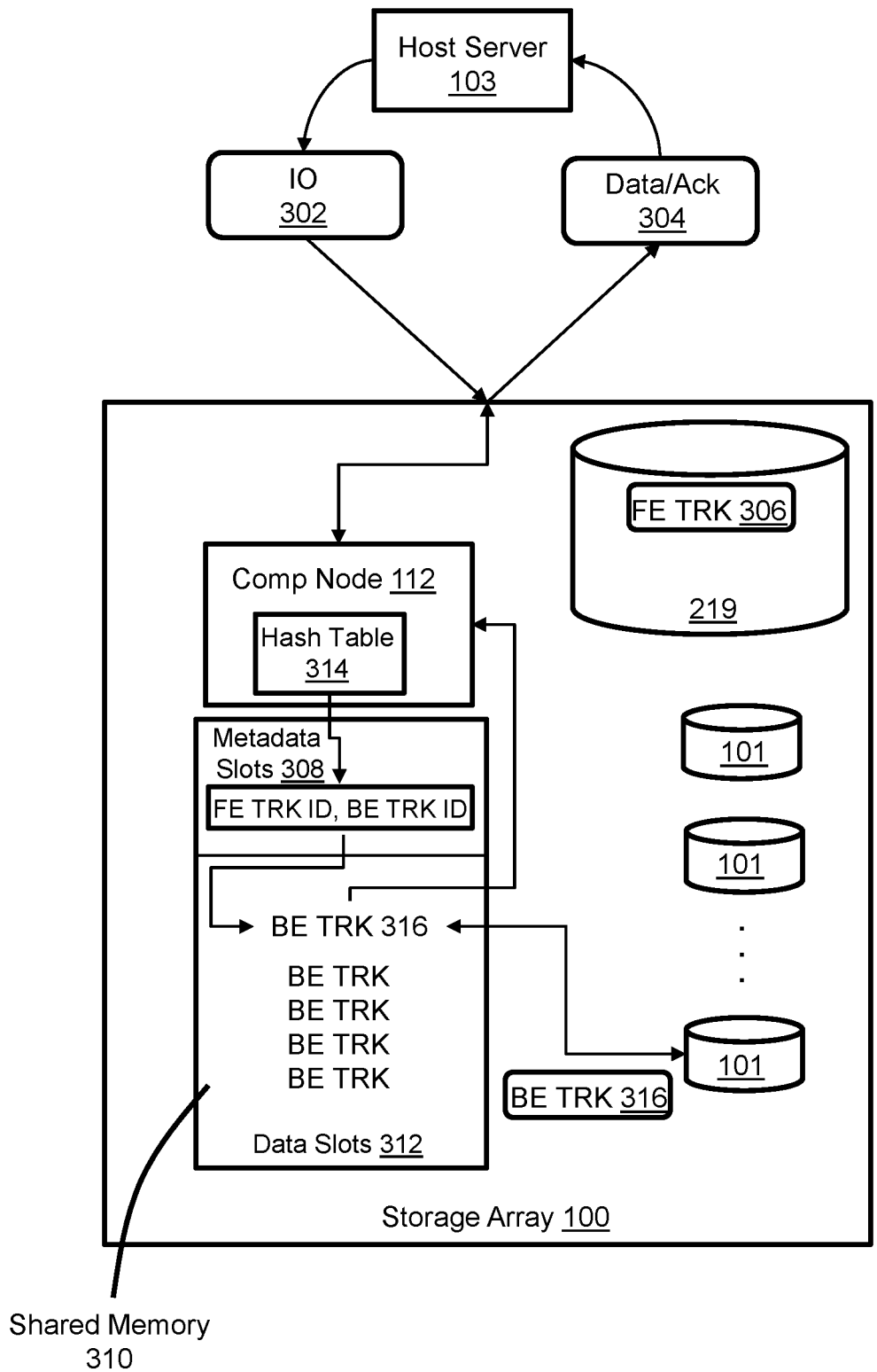
FIG. 3 illustrates use of BE TRK ID pointers and FE TRK ID pointers to process IOs to a storage object target.

FIG. 3 illustrates use of BE TRK ID pointers and FE TRK ID pointers in shared memory 310 to process IOs. In the illustrated example, compute node 112 receives an IO 302 from host 103. The IO 302 may be a Write command or a Read command with production storage object 219 as the target. A response 304 to the IO 302 is an Ack in the case of a Write command and data in the case of a Read command. The description below is for the case in which the IO 302 is a Read to a FE TRK 306 that is logically stored on the production storage object 219. Metadata including FE TRK IDs and BE TRK IDs is maintained in metadata slots 308 in an allocated portion of the shared memory 310. The BE TRK IDs are pointers to data slots 312 that contain BE TRKs of host application data. The data slots are located in another allocated portion of the shared memory 310. The compute node 112 identifies a metadata page corresponding to FE TRK 306 by inputting information such as the device number, cylinder number, head, and size obtained from the IO 302 into a hash table 314. The hash table 314 indicates the location of the corresponding metadata page in the metadata slots. The location of the metadata page in shared memory may be local or remote relative to compute node 112. A BE TRK ID pointer from that metadata page is obtained and used by the compute node 112 to find the corresponding data slot that contains BE TRK 316 which is associated with FE TRK 306. The BE TRK 316 is not necessarily present in the data slots when the IO is received because the managed drives 101 have much greater storage capacity than the data slots and IOs are serviced continuously. If the corresponding BE TRK 316 is not present in the data slots, then the compute node 112 locates and copies the BE TRK 316 from the managed drives 101 into an empty data slot. In the case of a Read, the FE TRK data specified by the IO 302 is obtained from the BE TRK 316 in the data slots and a copy of the data is sent to the host server 103. In the case of a Write, the FE TRK data is copied into the BE TRK in the data slots and eventually destaged to the managed drives 101, e.g., overwriting the stale copy on the managed drives. Regardless of whether the IO is a Read or a Write, the condition in which the BE TRK is already present in the data slots when the IO is received is referred to as a "cache hit" and the condition in which the BE TRK is not in the data slots when the IO is received is referred to as a "cache miss." All the metadata is generally maintained in the shared memory in order to facilitate timely IO processing.

Figure 4:
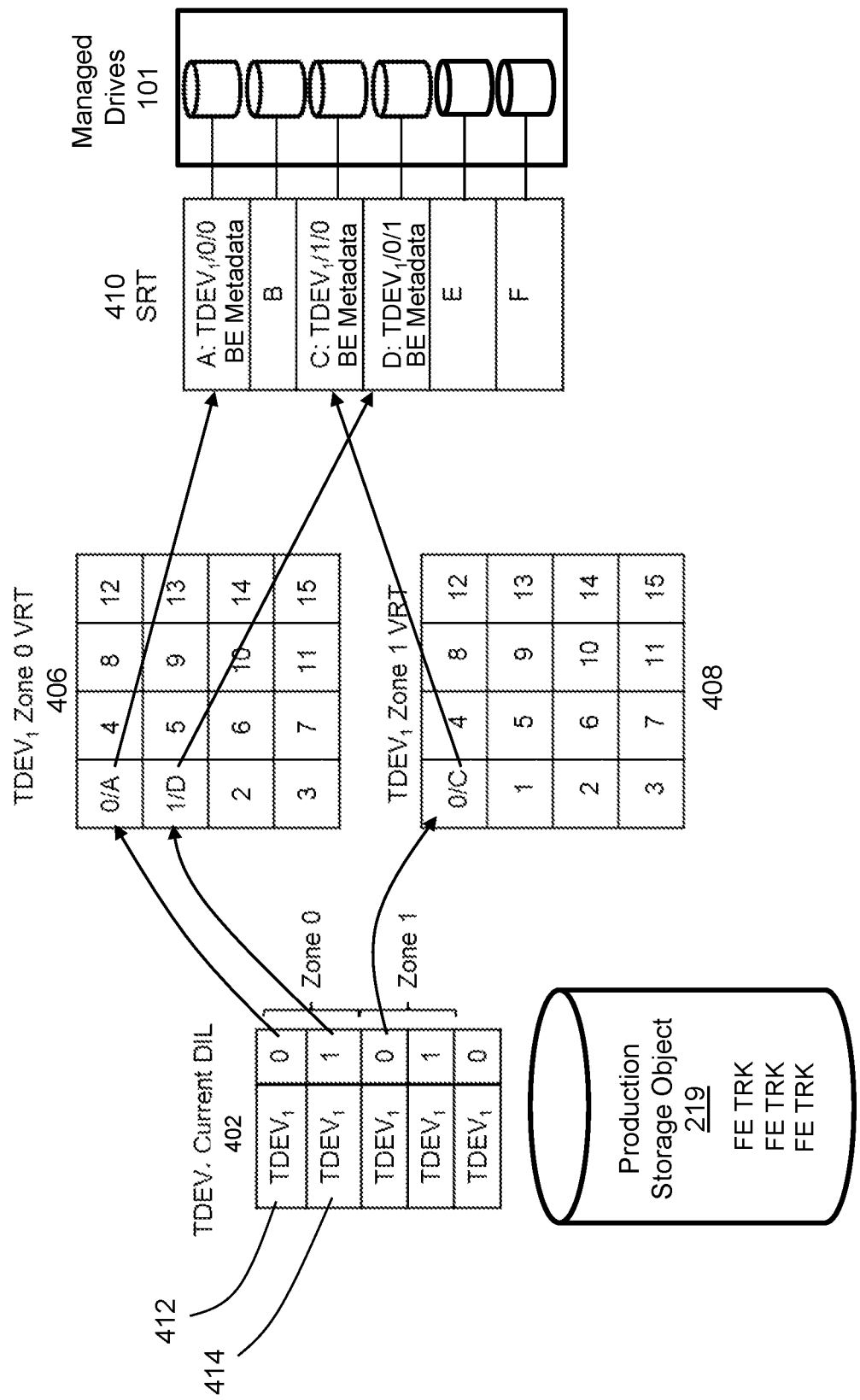
FIG. 4 illustrates use of pointers in a system replication data pointer table, direct index lookup table, and virtual replication data pointer tables to represent a storage object.

FIG. 4 illustrates use of a system replication data pointer table (SRT) 410, direct index lookup (DIL) table 402, and virtual replication data pointer tables (VRTs) 406, 408 to represent production storage object 219 (referenced in the tables as TDEV1). A SRT is a system level track-based data structure containing metadata indicative of the actual (physical layer) backend allocations for all targetless snapshots in the storage array. At least one DIL table is associated with each represented storage object, e.g., TDEV1. Each DIL table includes zones of same-sized groups of entries for same-sized address range portions of the represented storage object. For example, and without limitation, each entry in the DIL table may correspond to a track of data on the represented storage object. Each utilized DIL table entry includes a source volume identifier, e.g., identifying TDEV1 as the source volume, and the reference number of the described track. At least one VRT is associated with each DIL table zone. Each utilized VRT entry maps a DIL table entry, and thus a source volume track, to an entry in the SRT 410, and thus the sectors of a backend track.

The size of the SRT 410 in terms of total entries corresponds to the storage capacity of the managed drives 101 of the storage array. Each utilized entry of the SRT includes backend (BE) metadata that maps between physical and virtual layers. BE metadata may include a pointer that identifies a storage allocation of a track on the managed drives. The pointer may indicate a drive ID, cylinder, head, and sectors. Each utilized SRT entry also includes metadata that identifies the represented storage object, e.g., TDEV1, DIL table zone, and node. Specific tracks on the TDEV that are associated with the SRT entry may be identified with a track offset and sequence range.

In the illustrated example a current DIL table 402 represents the current state of storage object TDEV1. Each zone has two entries and a zone 0 and a zone 1 are illustrated. The zones may be sequentially numbered and be associated with groups of sequentially numbered tracks of the source volume. VRT 406 is associated with zone 0 of TDEV1 and VRT 408 is associated with zone 1 of TDEV1. The SRT 410 has entries that map backend track allocations for the TDEV on the managed drives 101. Each utilized VRT entry maps a DIL table entry, and thus a source volume track, to an entry in the SRT 410, and thus sectors of a backend track. In the illustrated example zone 0 of DIL table 402 includes a first entry 412 with reference number 0 indicating that the data of the described TDEV1 track is at a location associated with reference number 0 of VRT 406. The entry in VRT 406 corresponding to reference number 0 indicates that the track data is associated with entry A in the SRT 410. Entry A in the SRT indicates the location of the track data on the managed drives 101 and identifies the TDEV, zone, and reference number, e.g., TDEV1/0/0. Similarly, zone 0 of DIL 402 includes a second entry 414 with reference number 1 indicating that the data of the described track is at a location associated with reference number 1 of VRT 406. The entry in VRT 406 corresponding to reference number 1 indicates that the track data is associated with entry D of the SRT 410. Entry D of the SRT indicates the location of the track data on the managed drives 101 and identifies the TDEV, zone and reference number, e.g., TDEV1/0/1. The reference numbers are unique within each VRT but may be reused by different VRTs. For example, zone 1 of DIL 402 includes a first entry with reference number 0 indicating that the data of the described track is at a location associated with reference number 0 of VRT 408 while the entry in VRT 408 corresponding to reference number 0 indicates that the track data is associated with entry C of the SRT. Entry C of the SRT indicates the location of the track data on the managed drives 101 and identifies the TDEV, zone and reference number, e.g., TDEV1/1/0. Entries from multiple VRTs may reference the same SRT entry, e.g., if different zones or different TDEVs include replicated track data. The VRT objects may be implemented as sparse 4K metadata objects that are instantiated and populated as needed.

As indicated by FIGS. 3 and 4, storage arrays maintain significant amounts of metadata in shared memory. It is sometimes necessary to access that metadata for purposes other than live IO processing, e.g., to evaluate, validate, and manage storage objects. This can be problematic because the metadata in shared memory is distributed across the local memories of multiple compute nodes and, although each compute node can remotely access the metadata in the local memories of other compute nodes, remotely accessing the local memories of other compute nodes to perform tasks that involve finding and potentially manipulating a large number of metadata objects can be slow. For example, calculating the amount of data logically stored on a production storage object requires remotely finding and counting the number of BE TRK ID pointers associated with that storage object in each of the compute node local memories. Use of non-volatile memory to increase shared memory size and the need for more metadata to accommodate increasing storage capacity requirements exacerbates the problem.

Figure 5:
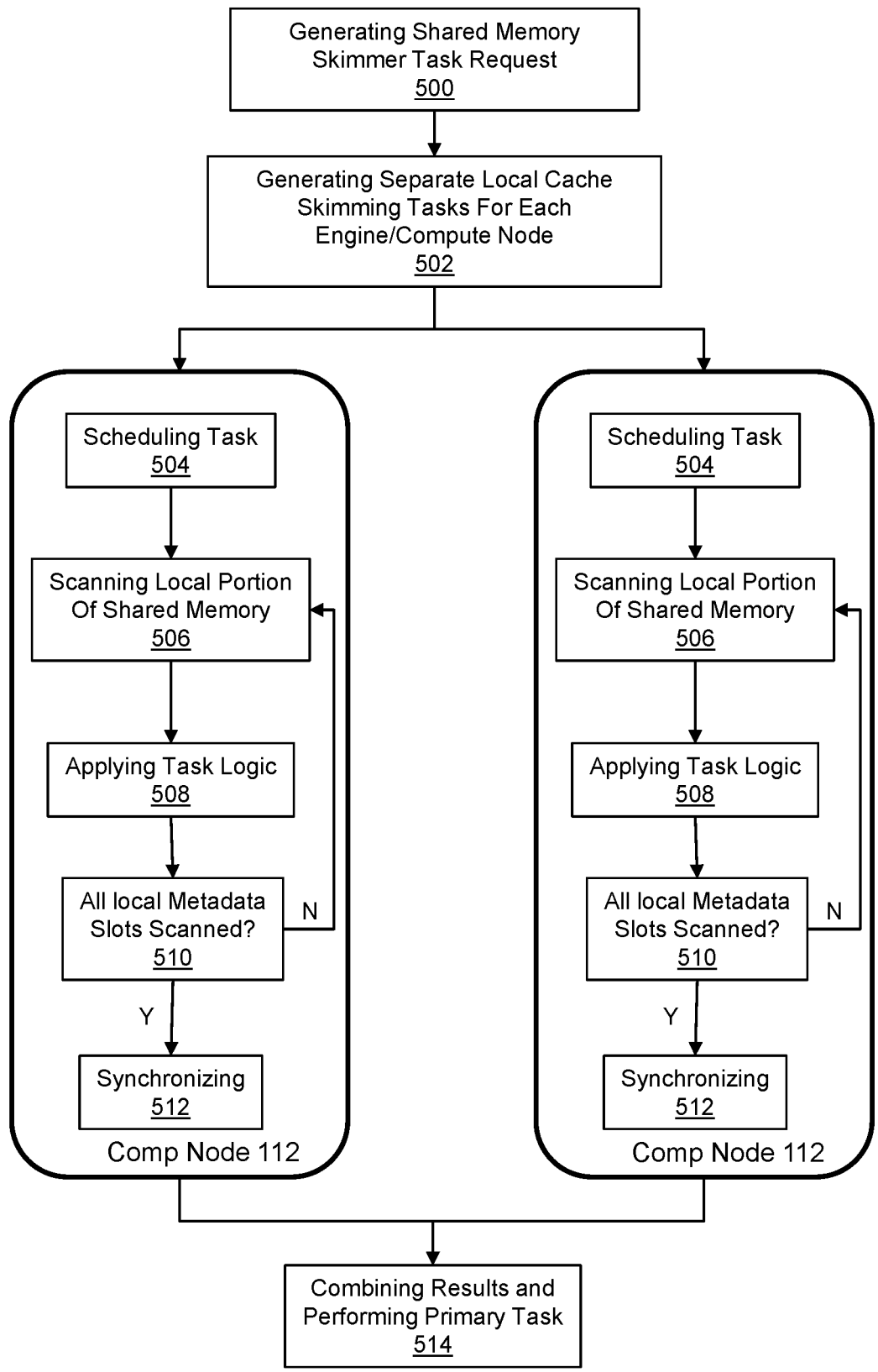
FIG. 5 illustrates generation and use of per-compute node cache skimming tasks to perform a primary task on a storage object.

FIG. 5 illustrates generation and use of per-compute node cache skimming tasks to perform a primary task on a storage object. Step 500 is generating a shared memory skimmer task request. The request may define a primary task to be performed on a specified storage object. For context, and without limitation, the primary task could be to determine the amount of utilized storage capacity of a thinly provisioned production storage object. The actual amount of associated data stored on the managed drives may differ from the amount of data that is logically stored on the production storage object due to a variety of factors such as data compression and deduplication. The primary task may be generated automatically by a computer program or entered by an administrator. One of the task generators receives the primary task request and, in response, generates corresponding local cache skimming tasks for each engine/compute node in the storage array as indicated in step 502. In some implementations, only one compute node per engine runs the local cache skimming task because the compute nodes of a single engine have mirrored local memories. However, both compute nodes of an engine could run the cache skimming task. Continuing with the contextual example described above, the local cache skimming task might include an identification of the storage object and logic for finding and counting BE TRK ID pointers associated with that storage object in order to calculate the utilized storage capacity of that storage object.

Each compute node 112 runs its local cache skimming tasks independently. Each compute node 112 enqueues the new local cache skimming task with a task scheduler that manages execution of all local cache skimming tasks that run on that compute node. Step 504 is scheduling the cache skimming task. The number of cache skimming tasks running simultaneously on the compute node may be limited. The task scheduler functions to schedule execution in a coordinated manner relative to other local cache skimming tasks. Step 506 is scanning the local portion of the shared memory. The step is performed by the processor that is local (on the same PCB) as the memory components. The scan may be a search to find metadata pages in the metadata slots with attributes that match attributes specified in the local cache skimming task, e.g., FE-TRK IDs or BE TRK IDs of the storage object. Step 508 is applying the task logic to the metadata pages located by the scanning step. The task logic may be specified in the local cache skimming task. For example, the task logic may be to increment a count of metadata pages that match the attributes designated in the local cache skimming task. If local metadata slots remain to be scanned as determined in step 510, then flow returns to step 506. If all local metadata slots have been scanned as determined in step 510 then the local cache skimming tasks running on all compute nodes may synchronize to report local results in step 512. Step 514 is combining the local results and using the combined local results to perform the primary task, e.g., summing the counts of local pointers to the storage object and multiplying the count by the data track size to determine the utilized storage capacity of the storage object.

Although the example of calculating the utilized storage capacity of a storage object has been used to provide context, a wide variety of skimmer tasks could be implemented. For example, skimmer tasks could be generated to find data for recovery operations or to perform validity checks of storage objects and stored blocks by verifying that BE TRK IDs point to stored data and stored data belongs to an existing storage object. Those of ordinary skill in the art will recognize a wide variety of skimmer tasks that could be implemented based on the ability to scan metadata pages more efficiently for a large number of metadata object instances.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented in a storage system having a plurality of compute nodes that each allocate a portion of local memory to a shared memory that is accessible by other ones of the compute nodes, comprising:

receiving a storage management request to perform a primary task to evaluate a storage object that is a logical disk drive on which data associated with only one host application is maintained, the storage object having contiguous logical block addresses that are mapped by metadata to physical addresses on a plurality of physical disk drives, the request not being associated with an input-output (IO) command to access the data stored on the storage object;

generating separate, same-purpose, secondary shared memory skimming tasks corresponding to the primary task for each of the plurality of compute nodes, each of the separate secondary tasks specifying at least one attribute of the metadata associated with the storage object and at least one task logic function that partially evaluates the storage object;

performing, at each of the plurality of compute nodes, the separate secondary shared memory skimming task generated for that compute node, including scanning the portion of the shared memory that is local to that compute node based on the attribute to identify matching pages of the metadata associated with the storage object in the portion of the shared memory that is local to that compute node;

without accessing the data or updating the metadata, performing, at each of the plurality of compute nodes, the task logic function on the identified matching pages of the metadata associated with the storage object to generate a local storage object evaluation result;

combining local storage object evaluation results generated by each separate secondary shared memory skimming task performed by each of the plurality of compute nodes; and using the combined local results to perform the primary task to evaluate the storage object.

2. The method of claim 1 comprising specifying a metadata object type as an attribute.

3. The method of claim 1 comprising specifying a metadata object corresponding to the storage object as an attribute.

4. The method of claim 1 comprising generating a task logic function that counts pointers associated with the storage object.

5. The method of claim 1 comprising generating a task logic function that counts instances of a specified type of metadata object.

6. The method of claim 1 comprising generating a task logic function that counts instances of a metadata object corresponding to the storage object.

7. The method of claim 1 comprising generating a task logic function that validates the identified matching pages of the metadata.

8. An apparatus comprising:

a storage system comprising a plurality of compute nodes that each allocate a portion of local memory to a shared memory that is accessible by other ones of the compute nodes; and at least one task generator configured to receive a storage management request to perform a primary task to evaluate a storage object that is a logical disk drive on which data associated with only one host application is maintained, the storage object having contiguous logical block addresses that are mapped by metadata to physical addresses on a plurality of physical disk drives, the request not being associated with an input-output (IO) command to access the data stored on the storage object, and generate separate, same-purpose, secondary shared memory skimming tasks corresponding to the primary task for each of the plurality of compute nodes, each of the separate secondary tasks specifying at least one attribute of the metadata associated with the storage object and at least one task logic function that partially evaluates the storage object; each of the plurality of compute nodes configured to perform the separate secondary shared memory skimming task generated for that compute node, including scanning the portion of the shared memory that is local to that compute node based on the attribute to identify matching pages of the metadata associated with the storage object in the portion of the shared memory that is local to that compute node and, without accessing the data or updating the metadata, performing the task logic function on the identified matching pages of the metadata associated with the storage object to generate a local storage object evaluation result; the task generator configured to combine local storage object evaluation results generated by each separate secondary shared memory skimming task performed by each of the plurality of compute nodes and use the combined local results to perform the primary task to evaluate the storage object.

9. The apparatus of claim 8 wherein a metadata object type is specified as an attribute.

10. The apparatus of claim 8 wherein a metadata object corresponding to the storage object is specified as an attribute.

11. The apparatus of claim 8 wherein the task logic function is configured to count pointers associated with the storage object.

12. The apparatus of claim 8 wherein the task logic function is configured to count instances of a specified type of metadata object.

13. The apparatus of claim 8 wherein the task logic function is configured to count instances of a metadata object corresponding to the storage object.

14. The apparatus of claim 8 wherein the task logic function is configured to validate the identified matching pages of the metadata.

15. A non-transitory computer-readable storage medium that stores computer-readable instructions that, when executed by a storage system having a plurality of compute nodes that each allocate a portion of local memory to a shared memory that is accessible by other ones of the compute nodes, cause the storage system to implement a method comprising the steps of:

receiving a storage management request to perform a primary task to evaluate a storage object that is a logical disk drive on which data associated with only one host application is maintained, the storage object having contiguous logical block addresses that are mapped by metadata to physical addresses on a plurality of physical disk drives, the request not being associated with an input-output (IO) command to access the data stored on the storage object;

generating separate, same-purpose, secondary shared memory skimming tasks corresponding to the primary task for each of the plurality of compute nodes, each of the separate secondary tasks specifying at least one attribute of the metadata associated with the storage object and at least one task logic function that partially evaluates the storage object;

performing, at each of the plurality of compute nodes, the separate secondary shared memory skimming task generated for that compute node, including scanning the portion of the shared memory that is local to that compute node based on the attribute to identify matching pages of the metadata associated with the storage object in the portion of the shared memory that is local to that compute node;

without accessing the data or updating the metadata, performing, at each of the plurality of compute nodes, the task logic function on the identified matching pages of the metadata associated with the storage object to generate a local storage object evaluation result;

combining local storage object evaluation results generated by each separate secondary shared memory skimming task performed by each of the plurality of compute nodes; and using the combined local results to perform the primary task to evaluate the storage object.

16. The non-transitory computer-readable storage medium of claim 15 comprising specifying a metadata object type as an attribute.

17. The non-transitory computer-readable storage medium of claim 15 comprising specifying a metadata object corresponding to the storage object as an attribute.

18. The non-transitory computer-readable storage medium of claim 15 comprising generating a task logic function that counts pointers associated with the storage object.

19. The non-transitory computer-readable storage medium of claim 15 comprising generating a task logic function that counts instances of a specified type of metadata object.

20. The non-transitory computer-readable storage medium of claim 15 comprising generating a task logic function that counts instances of a metadata object corresponding to the storage object.

* * * * *